United States Patent
Saadi

(10) Patent No.: US 12,398,674 B2
(45) Date of Patent: Aug. 26, 2025

(54) BEARING ASSEMBLY FOR A GAS TURBINE ENGINE

(71) Applicant: Pratt & Whitney Canada Corp., Longueuil (CA)

(72) Inventor: Abdelkhalek Saadi, Lasalle (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/377,397

(22) Filed: Oct. 6, 2023

(65) Prior Publication Data

US 2025/0116231 A1    Apr. 10, 2025

(51) Int. Cl.
*F02C 7/06* (2006.01)
*F02C 7/28* (2006.01)

(52) U.S. Cl.
CPC .................. *F02C 7/06* (2013.01); *F02C 7/28* (2013.01); *F05D 2240/50* (2013.01); *F05D 2240/55* (2013.01)

(58) Field of Classification Search
CPC .. F16C 2360/23; F16C 19/26; F16C 33/6685; F16C 19/06; F16C 33/7886; F16C 37/00; F16C 33/6659; F16C 37/007; F16C 33/72; F16C 33/76; F16C 33/7896; F16C 33/805; F16C 19/16; F16C 35/073; F01D 25/183; F01D 11/003; F01D 25/162; F01D 25/16; F01D 25/18; F01D 25/164; F01D 25/125; F01D 11/02; F05D 2240/55; F05D 2220/323; F05D 2240/54; F05D 2240/52; F05D 2260/98; F05D 2240/50; F05D 2240/60; F05D 2260/602; F05D 2260/6022; F02C 7/06; F02C 7/28; F04D 29/059
See application file for complete search history.

(56) References Cited

U.S. PATENT DOCUMENTS

| | | | | |
|---|---|---|---|---|
| 2,990,202 A | * | 6/1961 | Dennison | F16J 15/3404 277/408 |
| 2,992,842 A | * | 7/1961 | Shevchenko | F01D 11/003 277/306 |
| 3,357,757 A | | 12/1967 | Walton Morley | |

(Continued)

FOREIGN PATENT DOCUMENTS

CN    107060898 B    3/2019

OTHER PUBLICATIONS

EP Search Report for EP24205048.2 dated Feb. 12, 2025.

*Primary Examiner* — Eric J Zamora Alvarez
(74) *Attorney, Agent, or Firm* — Getz Balich LLC

(57) ABSTRACT

A gas turbine engine is provided that includes a static structure, a rotating shaft, and a bearing assembly. The bearing assembly includes a bearing and a seal subassembly. The bearing has inner and outer races and a plurality of roller elements. The outer race includes a shield member. The seal subassembly includes a seal element coupled with the static structure and a seal runner coupled with the rotating shaft. Portions of the seal runner, the outer race, and the inner race define a first bearing cavity. Portions of the seal runner, the outer race, the seal element, and the static structure define a lateral bearing cavity. The lateral bearing cavity is disposed axially between the first bearing cavity and the seal element. The outer race includes a plurality of drain holes that provide fluid communication between the first bearing cavity and the lateral bearing cavity.

20 Claims, 3 Drawing Sheets

(56) References Cited

U.S. PATENT DOCUMENTS

| | | | | |
|---|---|---|---|---|
| 4,344,506 | A | 8/1982 | Smith | |
| 4,406,460 | A * | 9/1983 | Slayton | F16J 15/3404 |
| | | | | 277/433 |
| 4,542,623 | A | 9/1985 | Hovan | |
| 4,928,978 | A * | 5/1990 | Shaffer | F16J 15/162 |
| | | | | 277/401 |
| 6,579,010 | B2 * | 6/2003 | Trapp | F16C 35/073 |
| | | | | 384/537 |
| 7,806,596 | B2 * | 10/2010 | Shatz | F16C 19/548 |
| | | | | 384/493 |
| 9,752,616 | B2 * | 9/2017 | Saadi | F16C 33/6685 |
| 9,777,592 | B2 | 10/2017 | Denis | |
| 10,364,846 | B2 * | 7/2019 | Clark | F16C 37/00 |
| 10,753,219 | B2 * | 8/2020 | Labbe | F01D 25/125 |
| 11,085,330 | B2 * | 8/2021 | Pankratov | F01D 25/183 |
| 11,261,754 | B2 * | 3/2022 | Patard | F01D 25/183 |
| 2008/0135336 | A1 * | 6/2008 | Jewess | F16C 33/6677 |
| | | | | 184/6.11 |
| 2012/0189235 | A1 | 7/2012 | Mcneil | |
| 2016/0032840 | A1 | 2/2016 | James | |
| 2020/0116047 | A1 * | 4/2020 | Theratil | F01D 25/183 |

\* cited by examiner

BEARING ASSEMBLY FOR A GAS TURBINE ENGINE

BACKGROUND OF THE INVENTION

1. Technical Field

The present disclosure relates to gas turbine engines in general and to a bearing assembly coupling a rotating shaft to a static structure of the turbofan gas engine in particular.

2. Background Information

A gas turbine engine of a type preferably provided for use in subsonic flight generally includes a shaft assembly rotating within a static structure of the gas turbine engine. The bearings supporting the shaft assembly within the static structure must accommodate axial displacement of the shaft assembly due to large changes in temperature and may be subject to a leakage airflow. The gas turbine engine directs a flow of lubricant at the bearings, a portion of which penetrates the bearings and enters the bearing cavity. In some applications, a leakage airflow may impinge directly on the bearing during certain engine operational segments detrimentally affecting lubrication of the bearing.

It would be desirable to have a bearing assembly that accommodates axial movement of a rotating shaft relative to a static structure, one that permits improved lubrication, and one that protects the bearing from airflow.

SUMMARY

According to an aspect of the present disclosure, a gas turbine engine is provided that includes a static structure, a rotating shaft, and a bearing assembly. The rotating shaft is disposed radially inward of the static structure. The bearing assembly includes a bearing and a seal subassembly. The bearing has inner and outer races and a plurality of roller elements disposed between the inner and outer races. The inner race is coupled with the rotating shaft and the outer race is coupled with the static structure. The outer race includes a shield member that extends radially inward toward the rotating shaft. The seal subassembly includes a seal element coupled with the static structure, and a seal runner coupled with the rotating shaft. The seal element is disposed to engage with the seal runner. A portion of the seal runner, a portion of the outer race including the shield member, and a portion of the inner race define a first bearing cavity. A portion of the seal runner, a portion of the outer race including the shield member, a portion of the seal element, and a portion of the static structure define a lateral bearing cavity. The lateral bearing cavity is disposed axially between the first bearing cavity and the seal element. The outer race includes a plurality of drain holes that provide fluid communication between the first bearing cavity and the lateral bearing cavity.

In any of the aspects or embodiments described above and herein, the outer race may have an inner radial surface, an outer radial surface, a first axial end, and a second axial end, and the shield member may extend radially inwardly from the inner radial surface and the shield member may be disposed at the first axial end of the outer race.

In any of the aspects or embodiments described above and herein, the shield member may be integral with the outer race.

In any of the aspects or embodiments described above and herein, each drain hole may extend along an axis disposed at an angle skewed relative to an axial centerline of the engine.

In any of the aspects or embodiments described above and herein, each drain hole may have a first end in communication with the first bearing cavity and a second end in communication with the lateral bearing cavity, and the first end may be disposed radially inward of and axially spaced apart from the second end.

In any of the aspects or embodiments described above and herein, the first end of each drain hole may be disposed at an intersection between the inner radial surface of the outer race and the shield member.

In any of the aspects or embodiments described above and herein, the seal runner may have a curved surface disposed axially between a seal surface and a protrusion that extends outwardly relative to the seal surface.

In any of the aspects or embodiments described above and herein, a portion of the curved surface may form a recess into the seal runner and a portion of the curved surface may extend radially outward to blend with the protrusion.

In any of the aspects or embodiments described above and herein, the seal element may include a seal element housing and a seal ring.

According to an aspect of the present disclosure, a gas turbine engine is provided that includes a static structure, a rotating shaft, and a bearing assembly. The rotating shaft is disposed radially inward of the static structure. The bearing assembly includes a bearing and a seal subassembly. The bearing has inner and outer races and a plurality of roller elements disposed between the inner and outer races. The inner race is coupled with the rotating shaft and the outer race is coupled with the static structure. The outer race includes an inner radial surface, an outer radial surface, and a shield member that extends radially away from the inner radial surface in a direction toward the rotating shaft. The seal subassembly includes a seal element coupled with the static structure, and a seal runner coupled with the rotating shaft. The seal runner has a seal surface and a protrusion that extends outwardly relative to the seal surface. The seal element is disposed to engage with the seal surface of the seal runner. The rotating shaft and the static structure are configured to permit relative axial travel therebetween between a first axial position wherein the seal runner protrusion and the shield member are aligned with one another, and a second axial position wherein the seal runner protrusion and the shield member are misaligned with one another.

In any of the aspects or embodiments described above and herein, a portion of the seal runner, a portion of the outer race including the shield member, and a portion of the inner race may define a first bearing cavity, and a portion of the seal runner, a portion of the outer race including the shield member, a portion of the seal element, and a portion of the static structure may define a lateral bearing cavity. The lateral bearing cavity may be disposed axially between the first bearing cavity and the seal element. The outer race may include a plurality of drain holes that provide fluid communication between the first bearing cavity and the lateral bearing cavity.

In any of the aspects or embodiments described above and herein, the seal element may include a seal element housing and a seal ring, and in the first axial position, the seal ring may engage with a first segment of the seal runner seal surface, and in the second axial position the seal ring may engage with a second segment of the seal runner seal surface.

According to an aspect of the present disclosure, a bearing assembly for use between a static structure and a rotating shaft of a gas turbine engine is provided. The rotating shaft is disposed radially inward of the static structure. The bearing assembly includes a bearing and a seal subassembly. The bearing has inner and outer races and a plurality of roller elements disposed between the inner and outer races. The inner race is configured for coupling with the rotating shaft and the outer race is configured for coupling with the static structure. The outer race has inner and outer radial surfaces, a shield member that extends radially away from the inner radial surface, and a plurality of drain holes. The seal subassembly includes a seal element configured for coupling with the static structure, and a seal runner configured for coupling with the rotating shaft. In an assembled form, the seal subassembly is configured such that the seal element is disposed to engage with the seal runner. The bearing assembly is configured to have an assembled form relative to the static structure and the rotating shaft, and in the assembled form a portion of the seal runner, a portion of the outer race including the shield member, and a portion of the inner race define a first bearing cavity, and in the assembled form a portion of the seal runner, a portion of the outer race including the shield member, a portion of the seal element, and a portion of the static structure define a lateral bearing cavity. The lateral bearing cavity is disposed axially between the first bearing cavity and the seal element. In the assembled form the plurality of drain holes provide fluid communication between the first bearing cavity and the lateral bearing cavity.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
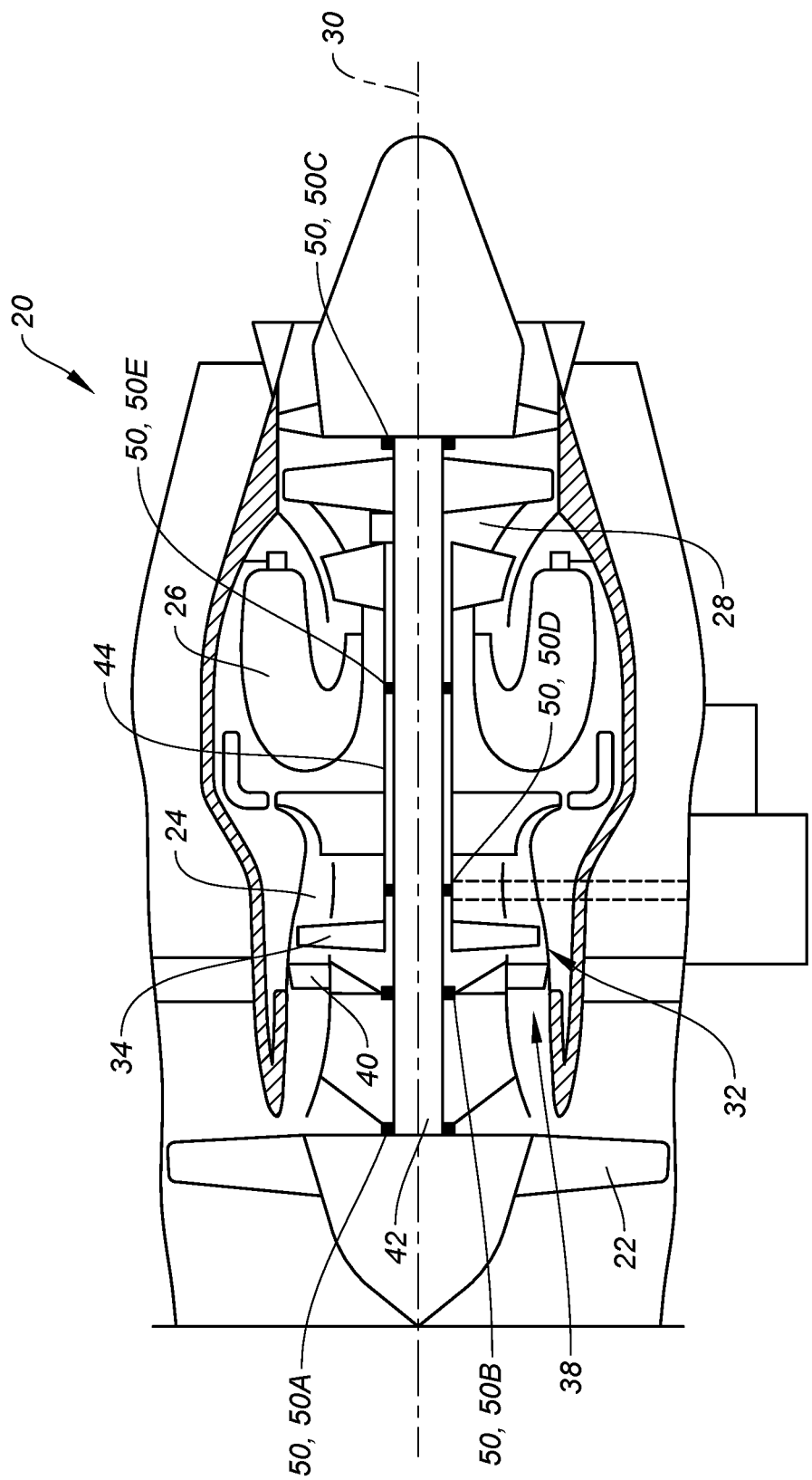
FIG. 1 is a schematic cross-sectional view of a turbofan gas turbine engine having a bearing arrangement.

FIG. 1 illustrates a gas turbine engine 20 configured as a turbofan engine. The gas turbine engine 20 includes a fan section 22, a compressor section 24, a combustor 26, and a turbine section 28 extending along an axial centerline 30. The terms "forward" and "aft" are used herein to indicate position along the axial centerline 30; referring to the engine 20 shown in FIG. 1, the fan section 22 is disposed forward of the compressor section 24, and the compressor section 24 is disposed aft of the fan section 22. The fan section 22 and a portion of the turbine section 28 (i.e., the low pressure turbine) are connected by a low pressure shaft 42. The term "radial" refers to a direction that is perpendicular to the axial centerline 30 and may be used herein to indicate position relative to the axial centerline 30; e.g., a first component positioned "radially inward" of a second component is disposed closer to the axial centerline 30 than the second component, and conversely the second component is disposed "radially outward" of the first component. The term "axial" refers to a direction that is parallel to the axial centerline 30.

The compressor section 24 includes a plurality of compressor rotor stages 32, each stage 32 having a plurality of compressor rotor blades 34 extending radially outward from a hub. The compressor rotor stages 32 and a portion of the turbine section 28 (i.e., the high pressure turbine) are connected by a high pressure shaft 44. The radially outermost surface of a compressor rotor blade 34 may be referred to as the rotor blade tip 36. Each compressor rotor stage 32 is configured for rotation about the axial centerline 30. The compressor section 24 further includes one or more compressor stator vane stages 38. Each compressor stator vane stage 38 includes a plurality of stator vanes 40 (e.g., airfoils) spaced apart from one another around the circumference of the compressor stator vane stage 38. Each compressor stator vane stage 38 is non-rotational about the axial centerline 30. Stator vanes 40 disposed immediately forward of a compressor rotor stage 32 are typically configured to guide airflow into the compressor rotor stage 32 in a desirable orientation. Stator vanes 40 disposed immediately aft of a compressor rotor stage 32 are typically configured to guide airflow exiting the compressor rotor stage 32 in a desirable orientation for downstream use.

Referring still to FIG. 1, the gas turbine engine 20 includes a plurality of bearing assemblies 50 configured to support the low pressure shaft 42 and the high pressure shaft 42. The low pressure shaft 42 is supported at its forward end by a first bearing assembly 50A and a second bearing assembly 50B, and at an aft end thereof by a third bearing assembly 50C. The first bearing assembly 50A is disposed axially forward of the second bearing assembly 50B. The high pressure shaft 44 is supported at its forward end by a fourth bearing assembly 50D and at an aft end thereof by a fifth bearing assembly 50E. As will be detailed herein, each bearing assembly 50A-E includes a bearing suitable for supporting the aforesaid shafts 42, 44. Each bearing may be configured to accommodate a radial load and/or a thrust load. Other than as described herein, the present disclosure is not limited to any particular type of bearing. The arrangement of bearing assemblies 50A-E within the gas turbine engine 20 shown in FIG. 1 is provided as an example only and the present disclosure is not limited thereto.

Figure 2:
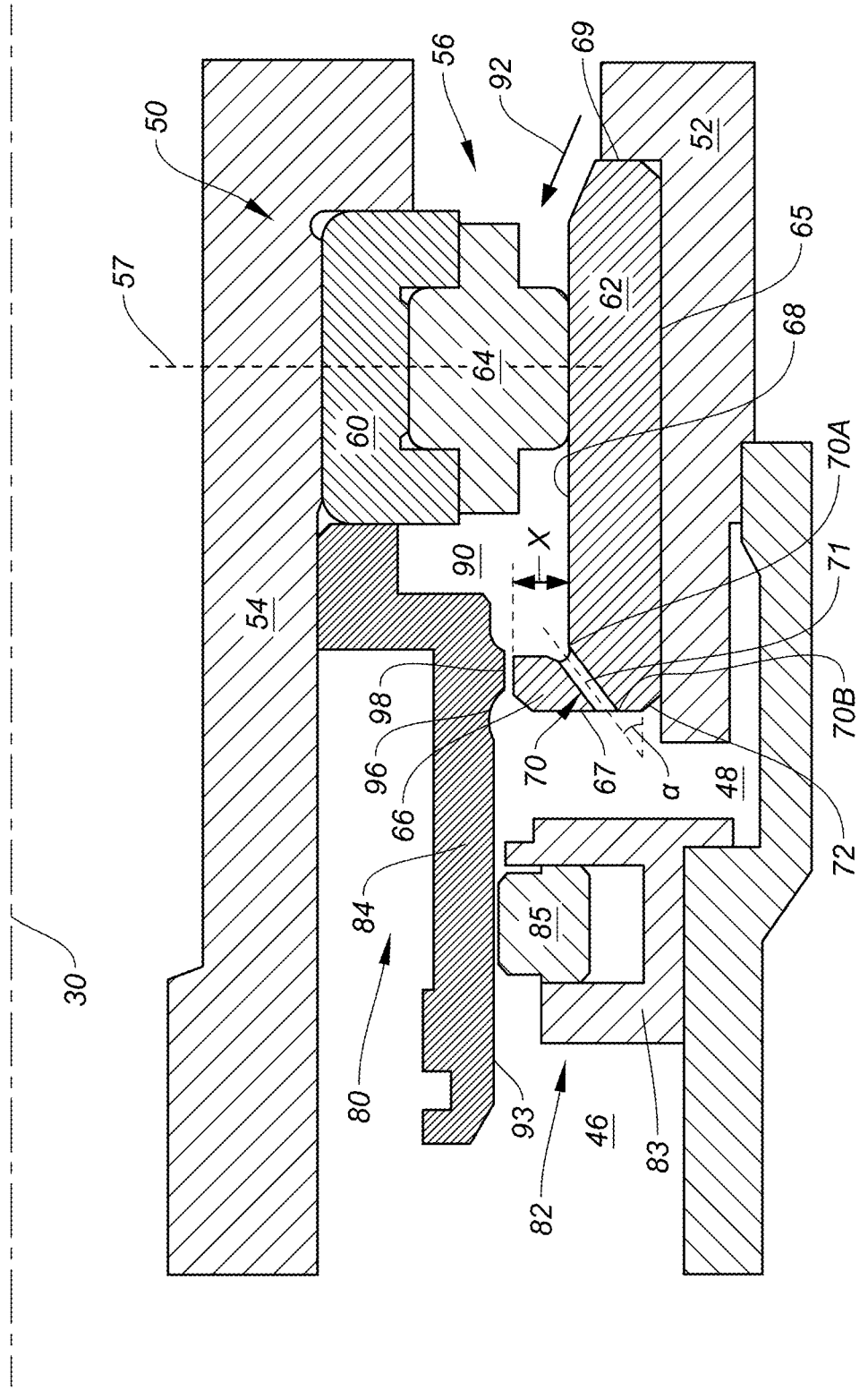
FIG. 2 is a cross-sectional view of the casing of FIG. 1 illustrating a bearing assembly in a first axial position.

Referring to FIG. 2, the bearing assembly 50 discussed in detail below is an example of a present disclosure bearing assembly 50 that may be used between a static structure 52 and a rotating shaft 54. An engine centerline 30 is shown above the bearing assembly 50 to indicate the orientation of the bearing assembly 50 as shown in FIG. 2. As will be detailed herein, the bearing assembly 50 includes a bearing 56 and a seal subassembly 80.

The bearing 56 includes an inner race 60, an outer race 62, and a plurality of rolling elements 64 retained therebetween. The outer race 62 includes an inner radial surface 68, an outer radial surface 65, a first axial end 67, a second axial end 69, and a shield member 66. The shield member 66 extends radially inwardly from the inner radial surface 68 and is disposed at the first axial end 67 of the outer race 62. The shield member 66 extends radially inwardly a distance X from the inner radial surface 68 of the outer race 62. In FIG. 2, the shield member 66 is shown as integral with the outer race 62. Alternatively, the shield member 66 may be an independent component that is affixed to the annular outer race 62. The outer race 62 further includes a plurality of drain holes 70. Each drain hole 70 extends between a first end 70A disposed at the inner radial surface 68 and a second end 70B disposed at the first axial end 67 of the outer race 62. The plurality of drain holes 70 may be disposed at respective positions spaced apart from one another around the circumference of the outer race 62. The plurality of drain holes 70 may be equidistantly spaced apart from one another around the circumference of the outer race 62, but the present disclosure is not limited to equidistant spacing. Each drain hole 70 may extend along an axis 71 that is non-parallel to the engine axial centerline 30. In the example diagrammatically shown in FIG. 2, the axis 71 of each drain hole 70 is disposed at an angle alpha ("a") that is skewed relative to the axial centerline 30, such that the first end 70A of each drain hole 70 is disposed radially inward of (and axially separated from) the second end 70B of the respective drain hole 70. The angle alpha ("α") may be between 40 and 60 degrees. The outer race 62 may have an undercut/chamfer 72 extending between the outer radial surface 65 of the outer race 62 and the first axial end 67 of the outer race 62. The inner race 60 is affixed to a rotating shaft 54 (e.g., the low pressure shaft 42) and the outer race 62 is affixed to a static structure 52 (e.g., a static structure of the compressor section 24). In the example bearing assembly 50 shown in FIG. 2, the bearing 56 is positioned aft and downstream of the seal subassembly 80.

The seal subassembly 80 includes a seal element 82 and a seal runner 84. The seal element 82 is disposed radially outside of the seal runner 84. The seal element 82 includes a seal element housing 83 and a seal ring 85. The seal element 82 may be configured to allow the seal ring 85 to float within the seal element housing 83. The seal element 82 may be a unitary annular structure or may comprise a plurality of elements that collectively form the respective annular structure; e.g., a plurality of circumferential segments. An example of an acceptable seal element 82 is one having a carbon seal ring 85, but the present disclosure is not limited thereto.

The seal runner 84 may be a unitary annular structure or may comprise a plurality of elements that collectively form the respective annular structure; e.g., a plurality of circumferential segments. The seal runner 84 may include a seal surface 93, a curved surface 96, and a radially extending protrusion 98. The seal surface 93 extends axially and is configured for engagement with the seal ring 85. As will be described herein, the curved surface 96 is configured to directionally alter a flow of air passing by the curved surface 96, and the radially extending protrusion 98 may be configured to impede an airflow passing thereby. The curved surface 96 is disposed axially between the seal surface 93 and the protrusion 98; i.e., the seal surface 93 axially terminates at the curved surface 96. In the embodiment shown in FIG. 2, a portion of the curved surface 96 extends radially inward to form a recess into the body of the seal runner, and a portion of the curved surface 96 extends radially outward to blend with the protrusion 98.

In the bearing assembly 50 diagrammatically shown in FIG. 2, the seal element 82 is connected to the static structure 52 and the seal runner 84 is connected to the rotating shaft 54. The seal element 82 is configured to permit the seal ring 85 to engage with the seal surface 93 of the seal runner 84. The engagement between the seal ring 85 and the seal surface 93 is such that a flow of air may flow therebetween during operational segments of the gas turbine engine. Portions of the seal runner 84, the bearing inner race 60, the bearing outer race 62, and the rolling elements 64 define a bearing cavity 90. Portions of the static structure 52, the bearing outer race 62, the seal element 82, and the seal runner 84 define a lateral bearing cavity 48.

During operation of the engine 20 and bearing assembly 50, a lubricant flow 92 is directed at the aft side of the bearing 56. At least a portion of the lubricant flow 92 will migrate across the bearing 56 and will enter the bearing cavity 90. At the same time, a difference in static pressure will be present across the seal element 82; i.e., the static pressure ("$P_{46}$") in the region denoted "46" (on the side of the seal element 82 axially opposite the lateral bearing cavity 48) will be greater than the static pressure ("$P_{48}$") in the lateral bearing cavity 48 and the static pressure ("$P_{90}$") within the bearing cavity 90; see FIG. 3. The difference in air pressure across the seal element 82 causes a flow of air ("leakage airflow") to pass between the seal ring 85 and the seal runner 84 during operational segments of the gas turbine engine 20. The characteristics (i.e., volumetric rate of flow, air velocity) of the leakage airflow will depend both on the magnitude of the pressure difference across the seal element 82 as well as the size of the gap between the seal ring 85 and the seal surface 93 of the seal runner 84. Thermal gradients within the engine during operational segments may cause the temperature of rotating shaft 54 to differ from that of the static structure 52, and thermal expansion of the components may cause the gap between the seal element 82 and the seal surface 93 of the seal runner 84 to vary in magnitude. The gap between the seal ring 85 and the annular seal surface 93 may be circumferentially uniform, or it may vary at different circumferential locations.

The leakage airflow passing between the seal ring 85 and the seal surface 93 (i.e., traveling in a direction from forward to aft) left unchecked may undesirably impinge on the bearing 56. The present disclosure bearing assembly 50 provides an improved configuration that mitigates or prevents leakage flow impingement on the bearing 56. For example, the shield member 66 portion of the bearing outer race 62 extending radially toward the seal runner 84 decreases the annular gap therebetween and is understood to block at least some of the leakage airflow. In addition, the radially extending protrusion 98 extends radially toward the shield member 66 of the bearing outer race 62 and decreases the annular gap therebetween. The protrusion 98 is also understood to block at least some of the leakage airflow traveling axially. Still further, the curved surface 96 is understood to direct leakage airflow away from the seal runner 84 and towards the shield member 66 of the outer race 62 (diagrammatically shown as arrow 86). In this manner, at least a portion of the leakage airflow is directed away from the bearing cavity 90. That same portion of leakage airflow directed away from the bearing cavity 90 by the curved surface 96 may also interfere with any leakage airflow traveling axially and thereby impede its axial progress.

The drain holes 70 provide an egress passage for lubrication that may collect within the bearing cavity 90, allowing that lubricant to pass into the lateral bearing cavity 48 where it can be scavenged and returned into the lubrication system.

Figure 3:
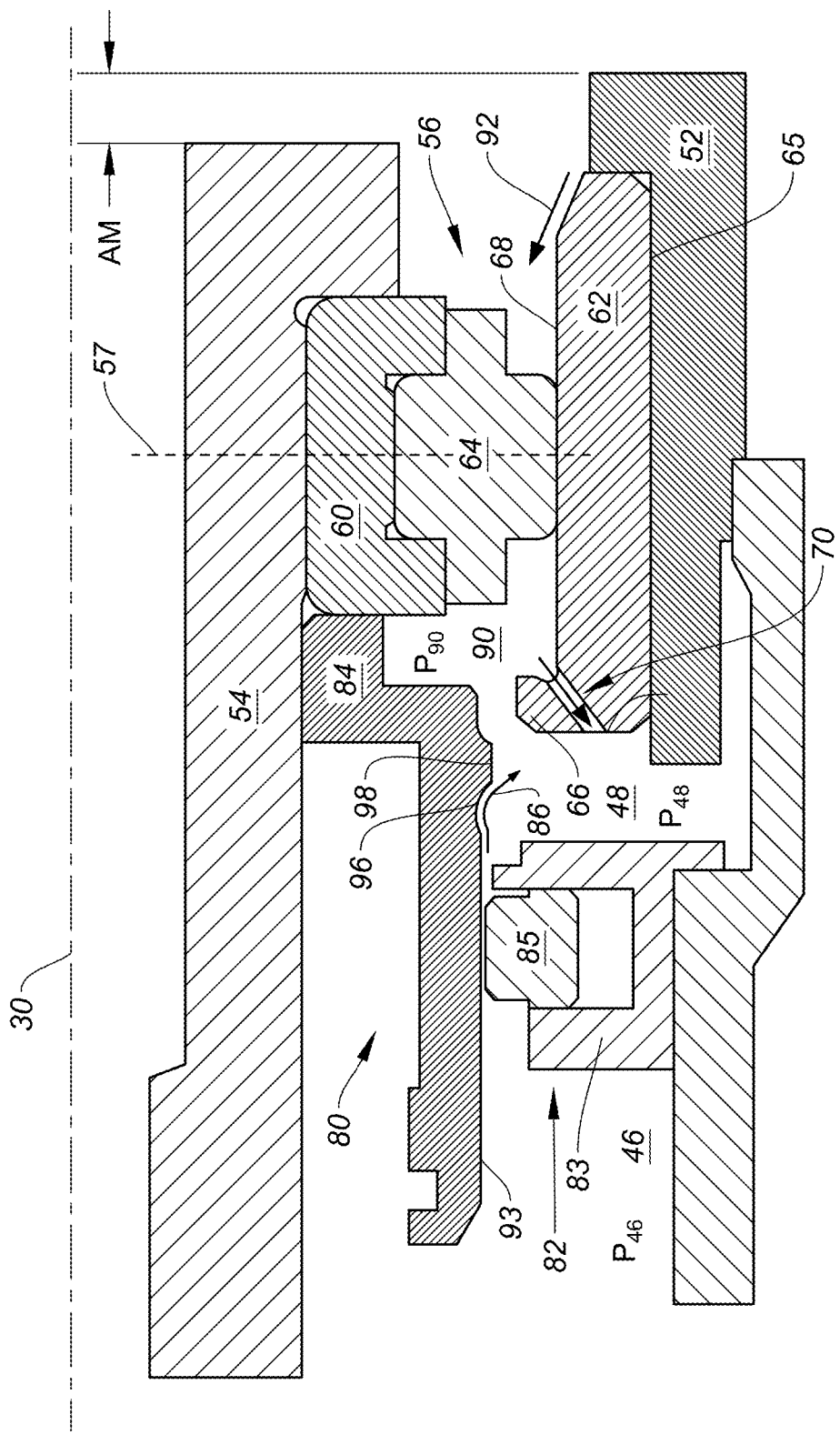
FIG. 3 is a cross-sectional view of the casing and bearing assembly of FIG. 2 in a second axial position.

The bearing assembly 50 is configured to not only accommodate component radial variances as described above but is also configured to accommodate relative axial travel between the rotating shaft 54 (and elements attached thereto) and the static structure 52 (and components attached thereto). During operation of the engine 20, the relative axial positions of the static portions and rotating portions of the bearing assembly 50 may vary. FIG. 2 illustrates the bearing assembly 50 in a first axial position configuration and FIG. 3 illustrates the bearing assembly 50 in a second axial position configuration. FIG. 3 diagrammatically illustrates the relative axial movement by the distance "AM". The differences in axial positions can be seen, for example by the relative axial positions of the seal runner 84 and the outer race 62. The bearing 56 has a bearing centerline 57 that bisects the inner race 60 and the rolling elements 64. The bearing centerline 57 does not change relative to the inner race 60 and the rolling elements 64, but may shift relative to the outer race 62, as can be diagrammatically seen in FIGS. 2 and 3. The bearing assembly components (e.g., the shield member 66, the seal runner protrusion 98, and the like are configured to permit the aforesaid axial travel between the rotating shaft 54 (and elements attached thereto) and the static structure 52 (and components attached thereto) without interference.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The invention claimed is:

1. A gas turbine engine, comprising:
   a static structure;
   a rotating shaft disposed radially inward of the static structure; and
   a bearing assembly that includes:
   a bearing having an inner race, an outer race, and a plurality of roller elements disposed between the inner race and the outer race, wherein the inner race is coupled with the rotating shaft and the outer race is coupled with the static structure, and the outer race includes a shield member that extends radially inward toward the rotating shaft; and
   a seal subassembly that includes a seal element coupled with the static structure, and a seal runner coupled with the rotating shaft, wherein the seal element is disposed to engage with the seal runner;
   wherein a portion of the seal runner, a portion of the outer race including the shield member, and a portion of the inner race define a first bearing cavity; and
   wherein a portion of the seal runner, a portion of the outer race including the shield member, a portion of the seal element, and a portion of the static structure define a lateral bearing cavity, and wherein the lateral bearing cavity is disposed axially between the first bearing cavity and the seal element; and
   wherein the outer race includes a plurality of drain holes that provide fluid communication between the first bearing cavity and the lateral bearing cavity.

2. The gas turbine engine of claim 1, wherein the outer race has an inner radial surface, an outer radial surface, a first axial end, and a second axial end; and wherein the shield member extends radially inwardly from the inner radial surface and the shield member is disposed at the first axial end of the outer race.

3. The gas turbine engine of claim 2, wherein the shield member is integral with the outer race.

4. The gas turbine engine of claim 2, wherein each drain hole of the plurality of drain holes extends along an axis disposed at an angle skewed relative to an axial centerline of the engine.

5. The gas turbine engine of claim 4, wherein each drain hole has a first end in communication with the first bearing cavity and a second end in communication with the lateral bearing cavity, and the first end is disposed radially inward of and axially spaced apart from the second end.

6. The gas turbine engine of claim 5, wherein the first end of each drain hole is disposed at an intersection between the inner radial surface of the outer race and the shield member.

7. The gas turbine engine of claim 1, wherein the seal runner has a curved surface disposed axially between a seal surface and a protrusion that extends outwardly relative to the seal surface.

8. The gas turbine engine of claim 7, wherein a portion of the curved surface forms a recess into the seal runner and a portion of the curved surface extends radially outward to blend with the protrusion.

9. The gas turbine engine of claim 7, wherein the seal element includes a seal element housing and a seal ring.

10. A gas turbine engine, comprising:
a static structure;
a rotating shaft disposed radially inward of the static structure; and
a bearing assembly that includes:
a bearing having an inner race, an outer race, and a plurality of roller elements disposed between the inner race and the outer race, wherein the inner race is coupled with the rotating shaft and the outer race is coupled with the static structure, and the outer race includes an inner radial surface, an outer radial surface, and a shield member that extends radially away from the inner radial surface in a direction toward the rotating shaft; and
a seal subassembly that includes a seal element coupled with the static structure, and a seal runner coupled with the rotating shaft, the seal runner having a seal surface and a protrusion that extends outwardly relative to the seal surface; wherein the seal element is disposed to engage with the seal surface of the seal runner;
wherein the rotating shaft and the static structure are configured to permit relative axial travel between a first axial position wherein the seal runner protrusion and the shield member are aligned with one another, and a second axial position wherein the seal runner protrusion and the shield member are misaligned with one another.

11. The gas turbine engine of claim 10, wherein a portion of the seal runner, a portion of the outer race including the shield member, and a portion of the inner race define a first bearing cavity; and wherein a portion of the seal runner, a portion of the outer race including the shield member, a portion of the seal element, and a portion of the static structure define a lateral bearing cavity, and wherein the lateral bearing cavity is disposed axially between the first bearing cavity and the seal element; and wherein the outer race includes a plurality of drain holes that provide fluid communication between the first bearing cavity and the lateral bearing cavity.

12. The gas turbine engine of claim 11, wherein each said drain hole of the plurality of drain holes extends along an axis disposed at an angle skewed relative to an axial centerline of the engine.

13. The gas turbine engine of claim 12, wherein a first end of each drain hole is disposed at an intersection between the inner radial surface of the outer race and the shield member.

14. The gas turbine engine of claim 10, wherein the seal runner has a curved surface disposed axially between the seal surface and the seal runner protrusion.

15. The gas turbine engine of claim 14, wherein a portion of the curved surface forms a recess into the seal runner and a portion of the curved surface extends radially outward to blend with the protrusion.

16. The gas turbine engine of claim 10, wherein the seal element includes a seal element housing and a seal ring; and wherein in the first axial position, the seal ring engages with a first segment of the seal runner seal surface, and in the second axial position the seal ring engages with a second segment of the seal runner seal surface.

17. A bearing assembly for use between a static structure and a rotating shaft of a gas turbine engine, wherein the rotating shaft is disposed radially inward of the static structure, the bearing assembly comprising:
a bearing having an inner race, an outer race, and a plurality of roller elements disposed between the inner race and the outer race, wherein the inner race is configured for coupling with the rotating shaft and the outer race is configured for coupling with the static structure, and the outer race has an inner radial surface, an outer radial surface, a shield member that extends radially away from the inner radial surface, and a plurality of drain holes; and
a seal subassembly that includes a seal element configured for coupling with the static structure, and a seal runner configured for coupling with the rotating shaft;
wherein in an assembled form, the seal subassembly is configured such that the seal element is disposed to engage with the seal runner; and
wherein the bearing assembly is configured to have an assembled form relative to the static structure and the rotating shaft, and in the assembled form a portion of the seal runner, a portion of the outer race including the shield member, and a portion of the inner race define a first bearing cavity, and in the assembled form a portion of the seal runner, a portion of the outer race including the shield member, a portion of the seal element, and a portion of the static structure define a lateral bearing cavity, the lateral bearing cavity disposed axially between the first bearing cavity and the seal element, and in the assembled form the plurality of drain holes provide fluid communication between the first bearing cavity and the lateral bearing cavity.

18. The bearing assembly of claim 17, wherein the seal runner has a seal surface and a protrusion that extends outwardly relative to the seal surface, and the seal element is disposed to engage with the seal surface of the seal runner.

19. The bearing assembly of claim 18, wherein the seal runner further includes a curved surface disposed axially between the seal surface and the protrusion, and a portion of the curved surface forms a recess into the seal runner and a portion of the curved surface extends radially outward to blend with the protrusion.

20. The bearing assembly of claim 19, wherein the seal element includes a seal element housing and a seal ring.

\* \* \* \* \*